United States Patent [19]

Thornborough et al.

[11] Patent Number: 5,025,470

[45] Date of Patent: Jun. 18, 1991

[54] AUTOMATIC METER READING SYSTEM WITH MALFUNCTION PROTECTION

[75] Inventors: Raymond J. Thornborough, Menomonee Falls; Donald H. Strobel, Cedarburg, both of Wis.

[73] Assignee: Badger Meter, Inc., Milwaukee, Wis.

[21] Appl. No.: 404,686

[22] Filed: Sep. 8, 1989

Related U.S. Application Data

[60] Division of Ser. No. 109,446, Jun. 19, 1987, Pat. No. 4,866,761, which is a continuation-in-part of Ser. No. 876,896, Jun. 20, 1986, Pat. No. 4,817,131.

[51] Int. Cl.$^5$ .......................................... H04M 11/00
[52] U.S. Cl. ..................................... 379/107; 340/512; 340/870.02
[58] Field of Search ........................ 379/106, 107, 28; 340/870.02, 512, 310 R; 324/511, 522, 537, 539

[56] References Cited

U.S. PATENT DOCUMENTS

| | | | |
|---|---|---|---|
| 4,337,466 | 6/1982 | Spahn | 379/107 |
| 4,357,601 | 11/1982 | McWilliams | 379/107 |
| 4,833,618 | 5/1989 | Verma et al. | 379/107 |
| 4,881,072 | 11/1989 | Carnel | 324/539 |

FOREIGN PATENT DOCUMENTS 0160838 11/1985 European Pat. Off. ........ 340/870.02

Primary Examiner—Jin F. Ng
Assistant Examiner—Wing F. Chan
Attorney, Agent, or Firm—Neuman, Williams, Anderson & Olson

[57] ABSTRACT

An output metering pulse signal is developed by measuring impedances at input terminals which are connected through lead wires to a metering unit shifted between low impedance and high impedance states while output malfunction signals are developed in response to open and shorted conditions of the lead wires, each open or shorted condition malfunction signal being developed by sensing the magnitude of the voltage at an input terminal during periodic brief applications of a strobe voltage to the input terminal through an impedance. Such output metering pulse and malfunction signals are developed in each of a plurality of automatic meter readers and are stored in the automatic meter for subsequent transmission over telephone lines to a utility control center.

11 Claims, 5 Drawing Sheets

AUTOMATIC METER READING SYSTEM WITH MALFUNCTION PROTECTION

REFERENCE TO RELATED APPLICATIONS

This application is a division of U.S. application Ser. No. 109,446, filed June 19, 1987, to be issued on Sept. 12, 1989 as U.S. Pat. No. 4,866,761, said application being a continuation-in-part of U.S. application Ser. No. 876,896, filed June 20, 1986, which was issued Mar. 28, 1989 as U.S. Pat. No. 4,817,131. The disclosures of said prior applications are incorporated by reference.

BACKGROUND OF THE INVENTION

1. Field of the Invention

This invention relates to a malfunction protection system for use in automatic meter reading systems or the like and more particularly to a system for protecting against malfunctions due to tampering or other causes and which highly reliable and trouble-free in operation while being comparatively simple in construction and operation. The protection system of the invention is particularly advantageous in a system which uses customer telephone lines for reporting of meter data.

2. Background of the Prior Art

Many systems have been used or proposed in the prior art for automatic transmission of meter data to a remote location, many of which use telephone lines for automatic reporting of meter and status data. In many of such systems, an interrogation signal is sent through telephone lines from a receiving station to a reporting station to initiate the sending of a report, the receiving station being either at a telephone exchange or being connected through a telephone line thereto. Such systems may involve ringing of the customer's telephone or the installation of special ring-suppress equipment at the customer's facility or, alternatively, special equipment at the telephone exchange. In another type of system, a reporting station initiates the making of a report.

Such systems may be subject to malfunctions from various causes. For example, in systems such as those designed for monitoring water, gas or electric consumption at a residential or commercial location, there is a possibility of tampering with the equipment in an attempt to prevent transmission of accurate data to a utility. This possibility has been recognized and dealt with in the prior art but it is found that the prior art systems have not been as reliable as would be desirable.

SUMMARY OF THE INVENTION

This invention was evolved with the general object of providing malfunction protection system for a metering system which is highly reliable and yet readily and economically implemented in a practical and efficient manner.

Important aspects of the invention relate to the recognition of the limitations and deficiencies of prior art systems while taking into account the important real needs of utilities and municipalities and their customers with respect to meter reading operations. The invention is particularly concerned with providing a system in which a monitoring unit may be connected through connecting lead wires to a metering switch and problems which may result from intentional or unintentional cutting of such connecting lead wires. It provides a system which is comparatively simple and which is highly reliable.

The malfunction protection system of the invention is usable in conjunction with a metering switch or the equivalent to provide a metering means having output terminals which are connected through connecting lead wires to input terminals of a monitoring circuit for transmission of metering pulses thereto. In accordance with the invention, the metering means in normal operation are arranged to operate through the connecting lead wires to present predetermined low and higher impedances at the input terminals of the monitoring circuit. The monitoring circuit is arranged to respond to such predetermined low and higher impedances to develop metering signals and is also arranged to respond to impedances outside the range of such predetermined low and higher impedances to develop malfunction signals. Preferably, the monitoring circuit responds to an impedance higher than the predetermined higher impedance to develop signals in response to malfunctions which include cutting of the connecting lead wires and it responds to an average impedance lower that the predetermined lower impedance to develop signals in response to malfunctions which include short-circuiting of the connecting wires.

Additional features of the invention relate to inclusion of the protection system in a metering system of a type such as disclosed in the aforementioned prior applications.

This invention has many other objects, features and advantages which will become more fully apparent from the following detailed description taken in conjunction with the accompanying drawings.

DESCRIPTION OF A PREFERRED EMBODIMENT

Figure 1:
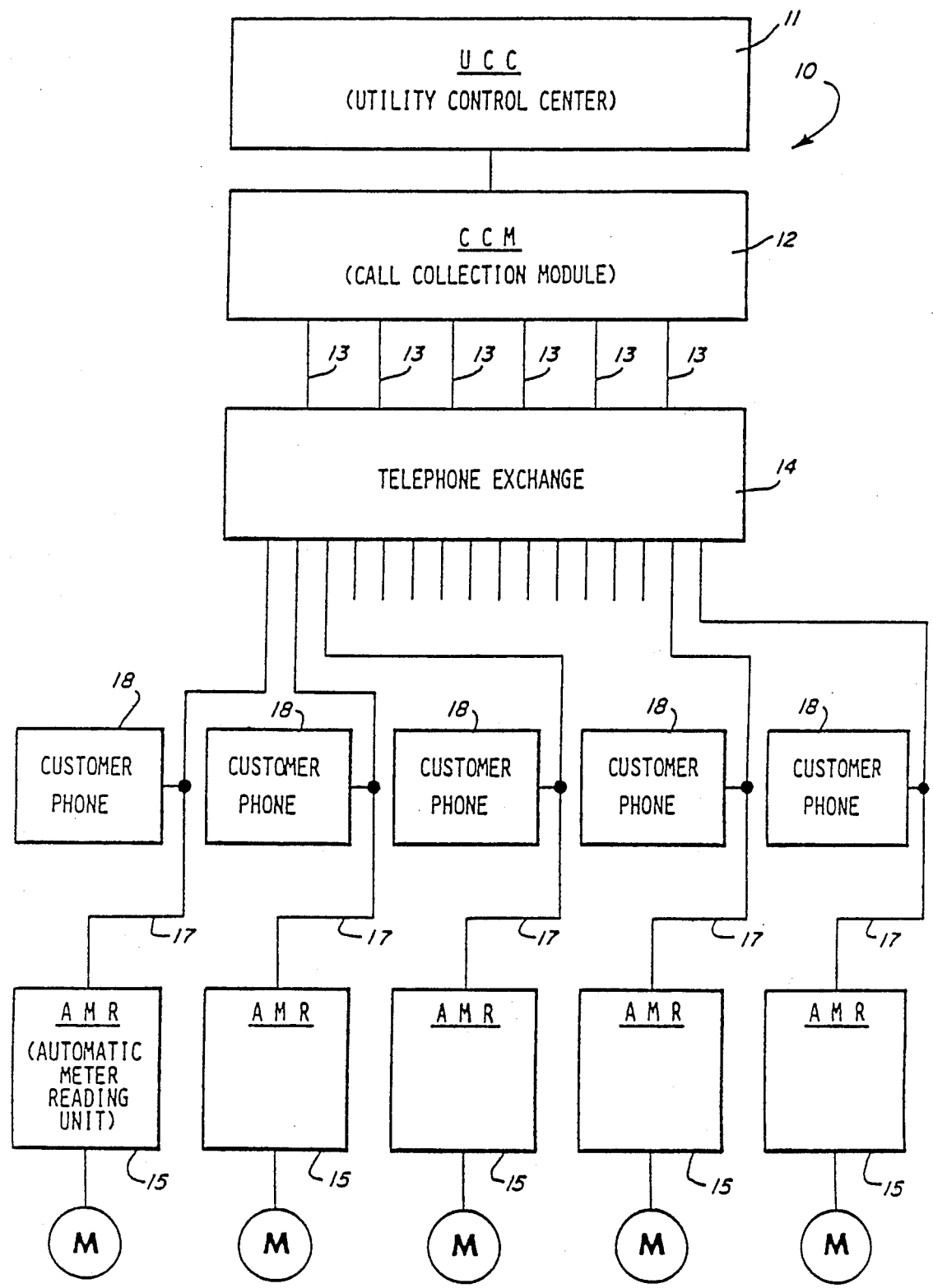
FIG. 1 is a schematic block diagram of a meter reading system constructed in accordance with the principles of this invention.
Figure 4:
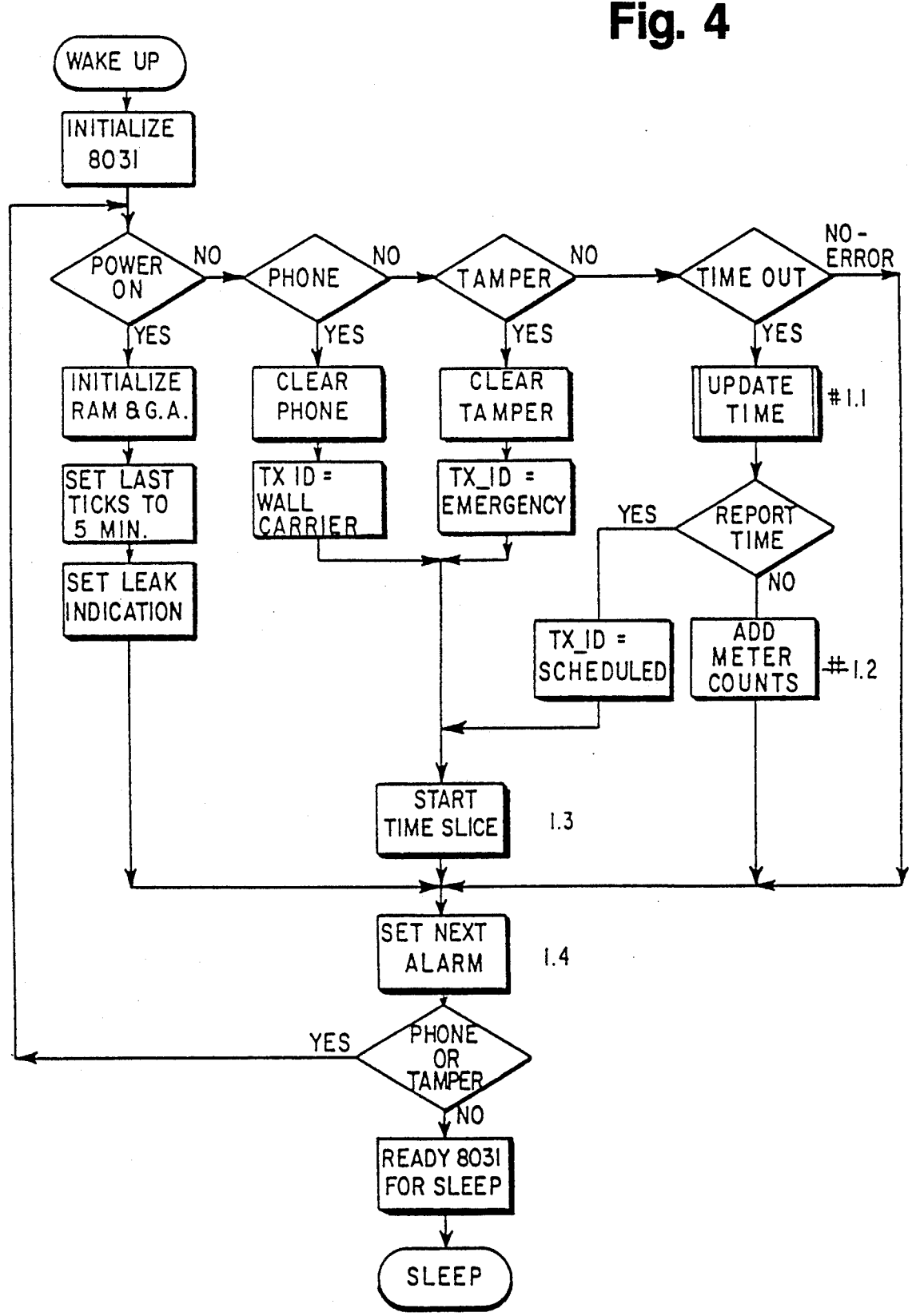
FIG. 4 is a flow chart illustrating operations performed upon receipt of a wake-up signal by a microprocessor of the automatic meter reader.
Figure 5:
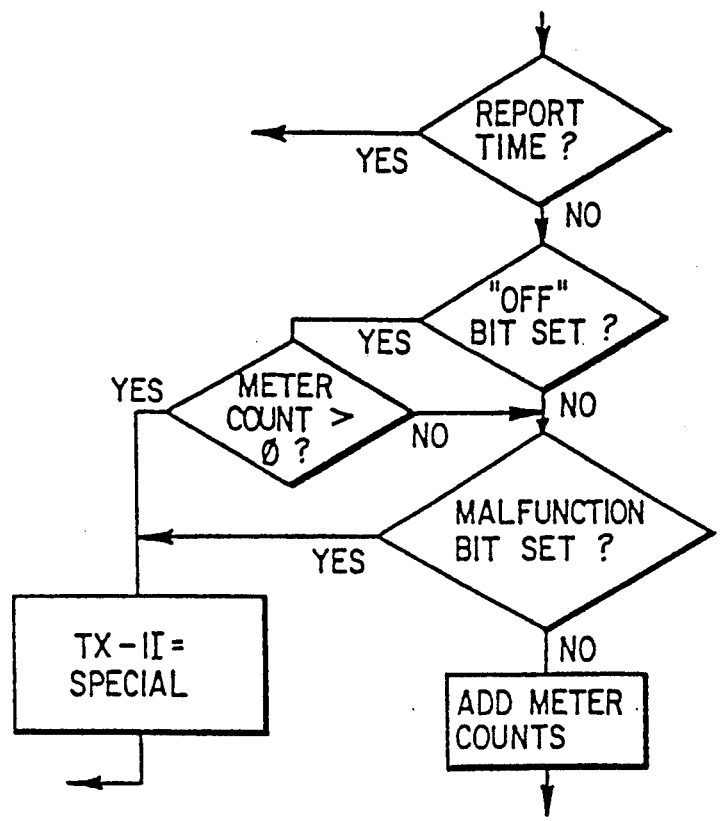
FIG. 5 is a flow chart corresponding to a right-hand portion of the flow chart of FIG. 4 and showing a modified operation.
Figure 6:
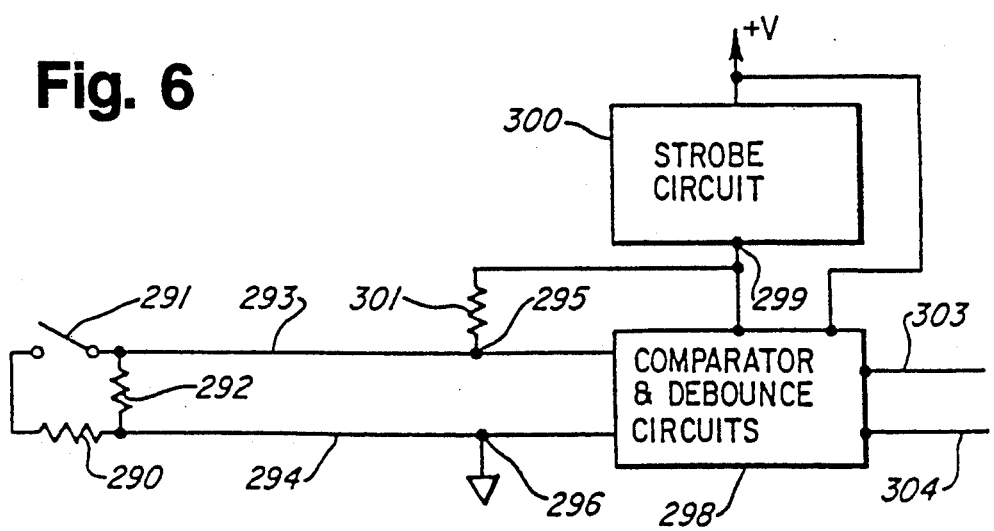
FIG. 6 is a schematic diagram showing an arrangement for detecting open or short conditions of a meter switch.

The malfunction protection system of the invention involves circuitry which connects a metering switch to an automatic meter reader and measuring functions performed in conjunction therewith, illustrated specifically in a flow chart of FIG. 5 and a circuit diagram of FIG. 6. The protection system is shown incorporated in a complete system 10 which is shown in a block diagram of FIG. 1 and which will be described in some detail in connection with FIGS. 2, 3 and 4 before describing details of the protection system shown in FIGS. 5 and 6. The system 10 is shown in detail in the aforementioned prior applications, the disclosures of which are incorporated by reference.

The illustrated system 10 comprises a central processing station or utility control center 11, hereinafter referred to as the "UCC", and at least one call collection module 12, hereinafter referred to as a "CCM". Each CCM 12 is connected through one or more telephone lines 13 to telephone exchange equipment 14, six lines being shown. The system 10 further includes a plurality of automatic meter reading units 15 connected to meters 16, which may be water, gas or electric meters at customers' residences. Each unit 15 is referred to herein as an "AMR" and is connected to the exchange equipment 14 through a telephone line 17 which may be a non-dedicated line with a customer's telephone 18 connected thereto, as shown.

The system 10 is very efficient in receiving raw meter data in the form of electrical signals developed at the meters 16, processing of such data and developing highly useful output data for use by a utility or municipality with provisions for storing data as long as required. The output data may include, for example, meter readings obtained at predetermined times, time-of-day accumulation data ("TOD"), peak rate data ("PR") and leakage, tamper and malfunction indications. The mode of operation is readily changeable or programmable from the UCC 11, and the system is such as to facilitate initial installation of AMR units, discontinuing service to one customer and starting service with another, keeping track of the operational status of all units, making analyses of operations and the rendering of reports which may be printed or transmitted. The UCC equipment includes a computer keyboard and display and its construction and operation are described in detail in the aforementioned prior applications.

The system 10 is also advantageous in that it so operates as to be substantially "invisible" with minimal interference with the customer's use of telephone lines and it does not require any modification of the telephone exchange equipment or of the customer lines or equipment.

In operation of the illustrated system, each AMR 15 receives and processes raw meter data, continually developing and updating TOD and PR data as well as accumulated readings. At an assigned time, typically at a certain day of the month and during a night-time period when the customer is least apt to be using the telephone, the AMR 15 goes to an off-hook condition and, if dial tone is detected, it proceeds to dial a telephone number corresponding to a line which is connected to the CCM 12. In one mode of operation, it waits for receipt of a carrier signal from the CCM 12. In another, it waits for the expiration of a certain delay time. In either case, the AMR 15 then proceeds to apply signals to the telephone line 17, in an attempt to send data to the CCM 12, including identification and security data and status data as well as the processed meter data.

The CCM 12 stores received data and processes it, making a security check and making a determination of new data to be sent to the AMR 15. Such new data are preceded by an acknowledgment character and may include security data and the time for the next call-in by the AMR 15. If properly received, the AMR 15 responds with an acknowledgment character and security data. Then the CCM 12 may send another acknowledgment character and control data such as an exemption schedule for holiday days when TOD/PR data are not to be accumulated and/or data as to new "windows" or periods during each day when TOD or PR data are to be accumulated. After a final acknowledgment character from the AMR, both the AMR and CCM go to on-hook conditions.

Important features of the system relate to the operation of the CCM 12 and particularly with respect to handling calls from a large number of the AMR units 15. By way of example, one CCM may handle calls from on the order of 60,000 AMR units each month on each line connected thereto. Such calls may be made during night-time hours when there will be minimal interference with use of customer telephones and when the loading of the telephone exchange is at a minimum. As a result, the time available for each call may be on the order of 20 seconds or less. In these circumstances, it is highly desirable that the time of each call-in be minimized to reduce the possible rejection of a call when two or more AMR units call in at about the same time. Also, of course, reducing the call-in time is desirable since it reduces telephone line charges.

As described in detail in the aforementioned prior applications, the CCM 12 stores control data which may include a telephone number of the CCM 12 and other data which might be classed as "global" data applicable to all AMR units and it also stores data corresponding to each individual AMR 15 such as its serial number and data as to the day of the week, month or quarter in which it is to report. Such control data can be changed from the UCC 11. However, at the time of call-in from any AMR 15, the CCM 12 is in a condition to quickly determine, from data stored in its memory, the control data to be sent to the AMR 15 which has initiated the call. Thus no communications with the UCC are required in handling a routine scheduled report from an AMR and the time required for handling each scheduled report is minimized.

Another feature of the CCM 12 is that it is equipped to simultaneously receive and handle calls on a plurality of telephone lines, the illustrated CCM being connected to six lines. With this feature, it is possible to take advantage of a "roll-over" operation which is available in most if not all telephone exchanges, in which only one telephone number is assigned to a group of lines and in which if one or more lines of the group are "busy" when a call is made to the assigned number, the call is directed by the exchange to the first non-busy line of the group. The ability to simultaneously process multiple calls is very important in avoiding the possible blocking of a call from one AMR 15 when a call from another AMR 15 is being handled or when a call is accidentally or maliciously made to the assigned number by a source other than an AMR 15.

These and other features of the CCM 12, as well as associated features of the UCC 11 and the cooperation of the UCC 11 and the CCM 12, are described in detail in the aforementioned prior applications.

AMR UNITS 15

Figure 2:
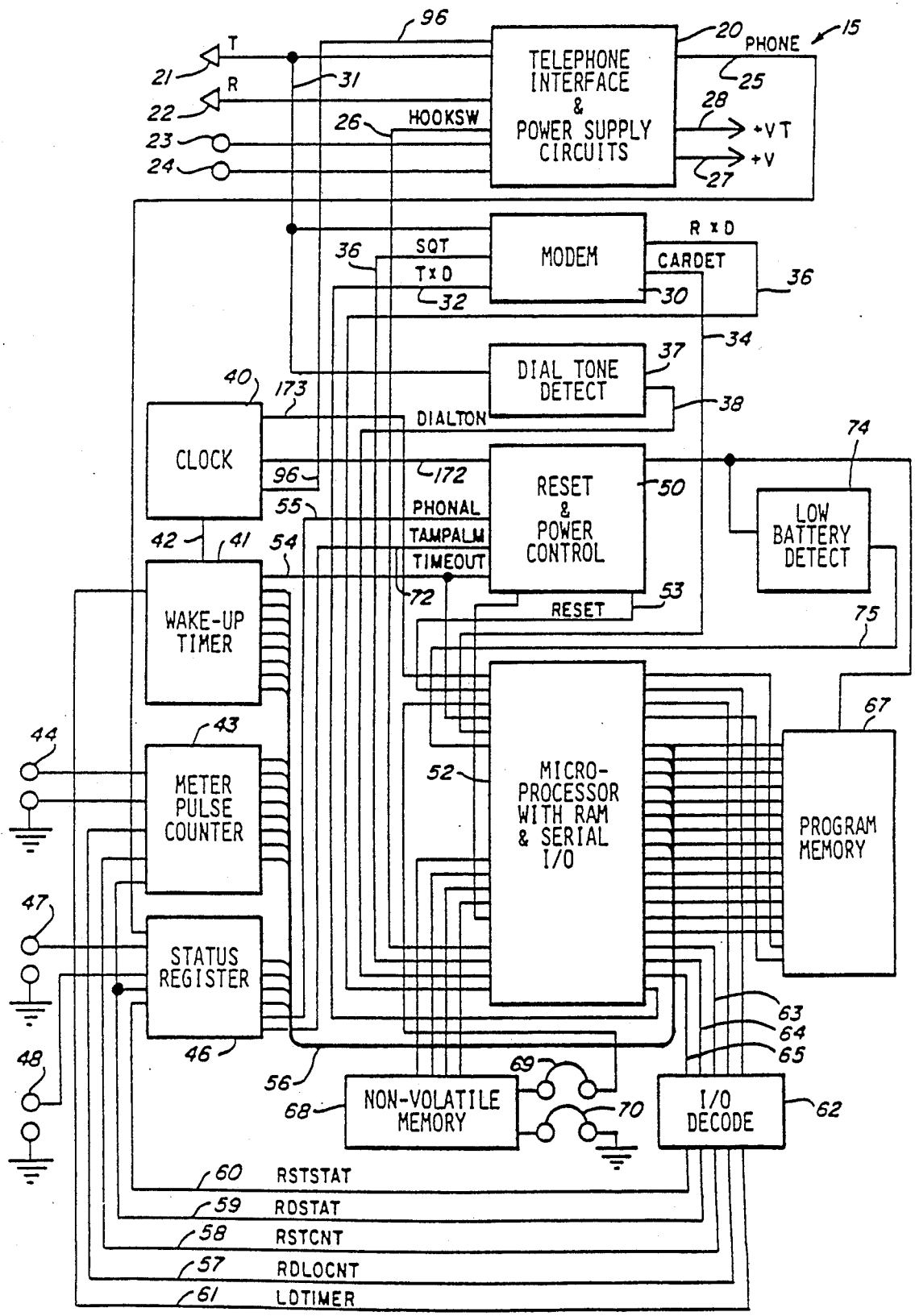
FIG. 2 is a schematic block diagram of an automatic meter reader of the system of FIG. 1.

FIG. 2 is a schematic block diagram of one of the automatic meter reading units 15. Each unit 15 includes telephone interface and power supply circuitry 20, connected to "tip" and "ring" telephone line terminals 21 and 22 and connected to battery terminals 23 and 24. Circuitry 20 operates to develop a signal on a "PHONE" line 25 when a ring signal is detected on the telephone line and it includes a solid state hook switch operable to an off-hook condition in response to a signal applied thereto on a "HOOKSW" line 26. It also develops "+V" and "+VT" voltages on lines 27 and 28 which supply operating voltages to various circuits of the AMR 15. The +VT voltage on line 28 is developed from the telephone line voltage in the off-hook condition and is applied directly to circuits which are operative in the off-hook condition. The +V voltage on line 27 is applied to other circuits and is developed through a regulator from the battery voltage in the on-hook condition and from the +VT voltage in the off-hook condition, battery current being minimized. These and other features of the interface and power supply circuitry 20 are described in detail hereinafter in connection with FIG. 3.

A modem circuit 30 is provided having an input connected through a line 31 to the tip terminal 21. When operative as a modulator, the circuit 30 responds to digital signals applied on a "TXD" line 32 to send frequency shift modulated signals out on the telephone line. When operative as a demodulator, it detects the existence of a carrier signal on the telephone line to develop a signal on a "CARDET" line 34 and in response to a frequency shift modulated signal on the telephone line, it develops a corresponding digital signal on a "RXD" line 35. A disabling "squelch" signal is applied thereto at certain times, through a "SQT" line 36.

The AMR 15 also includes a dial tone detect circuit 37 which responds to a dial tone signal on line 31 to develop a signal on a "DIALTON" line 38. Circuit 37 as well as the modem circuit 30 are energized only in the off-hook condition from the +VT line 27 and do not draw battery current.

Additional circuits of the AMR 15 are provided for registering meter pulses and monitoring conditions and are energized at all times, normally from the battery, such circuits having very low current consumption. These include a clock circuit 40; a wake-up timer circuit 41 which responds to clock pulses applied thereto through a line 42; a meter pulse counter 43 which responds to meter pulses applied from a meter terminal 44; a status register circuit 46 which has inputs connected to the "PHONE" line 25 and to terminals 47 and 48 which are connected to switches for detection of tamper and freeze conditions; and a reset and power control circuit 50. A random access memory portion of a micro-processor 52 is also energized at all times, in both a "sleep" condition and a power-up or active condition. However, other circuits, including the main processing circuitry of the microprocessor 52 and serial input-output circuitry associated therewith, are operative only in the power-up condition which is established periodically for short intervals to store accumulated data, or to make a scheduled report or in response to incoming calls or tamper conditions.

Ordinarily, in the absence of a tamper alarm and except when a scheduled report is due, the microprocessor 52 is operated to the power-up condition periodically, e.g., every 5 minutes, in response to a signal applied through a "RESET" line 53 and developed by the reset and power control circuit 52 in response to a signal applied through a "TIMEOUT" line 54 from the wake-up timer 41. The microprocessor 52 then increments a 5 minute interval register, adds the meter count from the preceding 5 minutes to a total count register, adds counts to or updates time-of-day and peak rate registers, as appropriate, and then returns to the sleep condition.

When a scheduled report is due, the microprocessor 52 initiates an operation in which a signal is applied through the "HOOKSW" line 26 to the circuitry 20 to establish an off-hook condition and to then wait for a signal on the "DIALTON" line 38. Then a pulse-dialing operation is performed, through signals on the "HOOKSW" line 26, to dial the number of the CCM 12 and the microprocessor 52 then waits for a signal on the "CARDET" line 34. Then the microprocessor 52 applies a squelch signal to the modem 30 through the "SQT" line 36 and it then proceeds to apply signals through the "TXD" line 32 to the modem 30, to cause the modem 30 to send FSK modulated signals to the CCM 12 and thereby send data thereto. Then the microprocessor 52 monitors the "RXD" line 35 from the modem 30, for receipt of an acknowledgment character and data from the CCM 12. After data is sent back and forth in this way to effect a complete scheduled report transaction, the microprocessor 52 operates to set the wake-up timer 41, makes a final phone/tamper check and then returns to the sleep condition.

The scheduled report transaction is set forth in more detail in the aforementioned prior applications, along with other transactions which include an installation transaction performed when initially installing an AMR 15; a demand reading transaction which may be initiated by a request or demand call from the CCM to the AMR, as when stopping service to a customer who is moving or when starting service to a new customer at the same location; an emergency report transaction initiated in response to a tamper or other alarm condition; and a "brainwash" transaction usable through a call from the CCM to place an AMR 15 in a pre-installation condition.

Whenever any call is made to the customer's line, a signal is developed on the line 25 and is applied to the status register circuit 46 which, in turn, applies a signal through a "PHONAL" line 55 to the reset and power control circuit 50. The microprocessor 52 is then activated to determine whether the call came from the CCM 12 and, if so, to make an appropriate response, according to whether an installation transaction, a demand read transaction, or a "brainwash" transaction is indicated.

An eight line data bus 56 is provided for transmission of data between the microprocessor 52 and the wake-up timer 41, meter pulse counter 43 and status register 46. A signal is sent on a "RDLOCNT" line 57 to read the least significant 8 bits of data from the meter pulse counter 43 and a signal is sent on a "RSTCNT" line 58 to reset the meter pulse counter 43. Similarly, read and reset signals are sent to the status register through "RDSTAT" and "RSTSTAT" lines 59 and 60, the signal on line 59 being also applied to the meter pulse counter 43 and being used to read the most significant 3 bits of data from the meter pulse counter 43. The wake-up timer 41 is loaded with a predetermined count by applying a signal on a "LDTIMER" line 61. The signals on lines 57-61 are developed by an input/output address decoder circuit 62 which is connected to address lines of the microprocessor 52 through lines 63-65.

A program memory 67 is connected to the data bus 56 and to address lines of the microprocessor 52 and a non-volatile but programmable EEPROM memory 68 is connected to input/output ports of the microprocessor 52. As shown, terminals of the memory 68 are connectable through jumpers 69 and 70 to ground and to a terminal of the microprocessor 52, jumpers 69 and 70 being optional and being installed for a 128×8 EEPROM and being removed for a 16×16 EEPROM.

In response to a tamper condition, the status register circuit 46 immediately sends a signal through a "TAMPAL" line 72 to the reset and power control circuit 50 which applies a reset or "wake-up" signal through line 53 to the microprocessor 52. The microprocessor 52 then operates to immediately store certain key data in the non-volatile memory 68 and also operates to attempt to make a telephone call to the CCM 12 to report the tamper condition.

The AMR further includes a low battery detector 74, the output of which is connected through a line 75 to the processor 52 monitored following time-outs of the wake-up timer 41, the low battery condition being then reported.

OPERATION OF AMR MICROPROCESSOR 52

Figure 3:
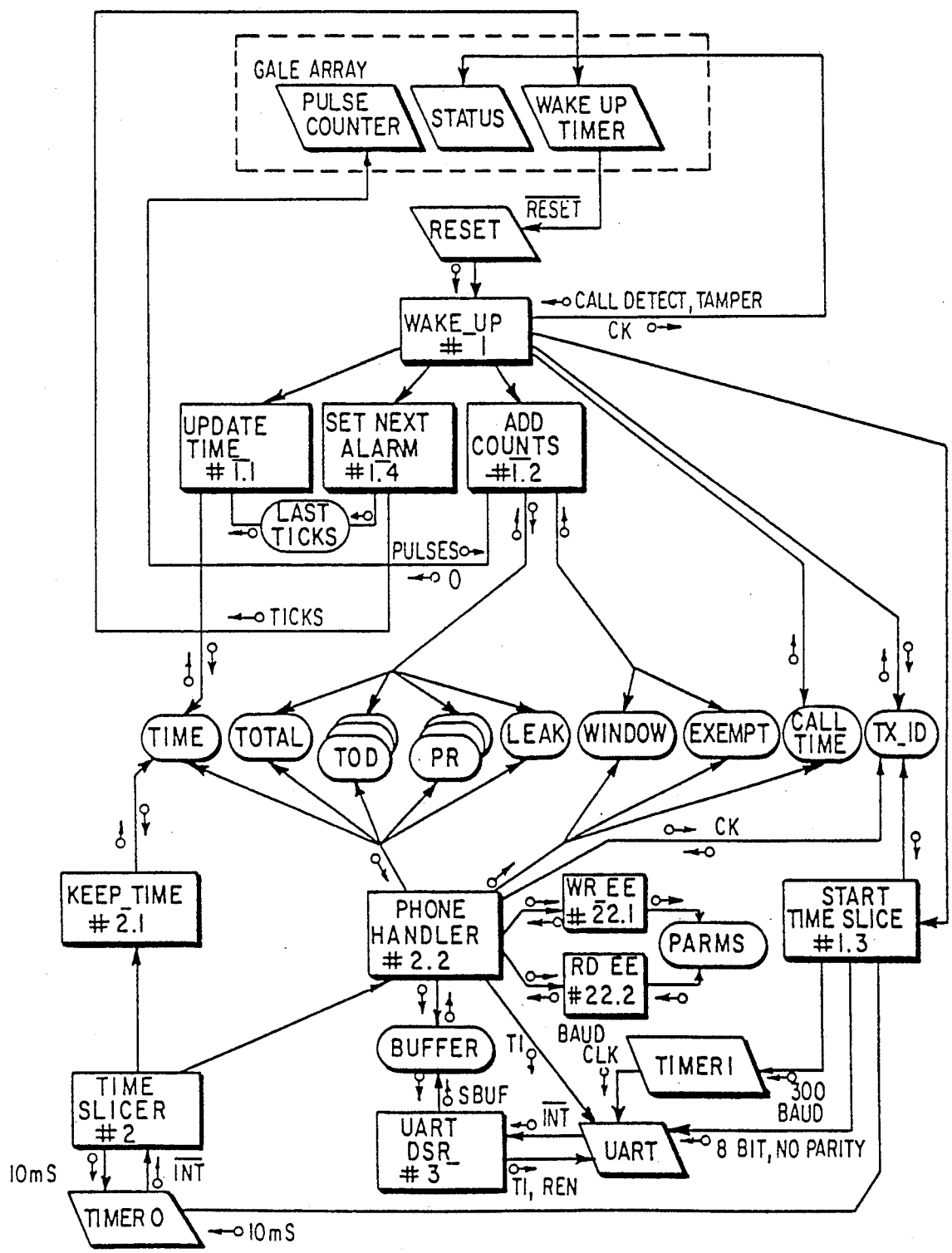
FIG. 3 is a structure chart illustrating the operation of a microprocessor of the automatic meter reader of FIG. 2.

The microprocessor 52 is controlled by a program in the program memory 67. An example of one program is contained in object code and source listing in the specification of the aforementioned U.S. application Ser. No. 876,896 filed June 20, 1986 and an example of another program is contained in Table I of a microfiche Appendix to the specification of the aforementioned U.S. application Ser. No. 109,446 filed June 19, 1987. Each program is formulated for a type 80C31 microprocessor. FIG. 3 is a structure chart and FIG. 4 is a flow chart depicting certain operations of the microprocessor 52. Other operations are shown in additional flow charts of the aforementioned prior applications.

Referring to FIG. 3, the wake-up timer 41, status register 46 and meter pulse counter 43 are depicted in a broken line rectangle labeled "Gate Array", this label being applied for the reason that it is expected that the various gates and counters of such circuits and also gates and counters of the clock circuit 40 and reset and power control circuit 50 will be embodied in a single gate array integrated circuit chip.

As indicated in FIG. 3, a wake-up operation is initiated from the wake-up timer or in response to call detect or tamper conditions, the wake-up operation being depicted in the flow chart of FIG. 4. This operation has various subsidiary operations associated therewith including "UPDATE TIME", "ADD COUNTS", "START TIME SLICE" and "SET NEXT ALARM" operations which are depicted in drawing figure of the aforementioned prior applications. A "TIME SLICER" operation is provided which utilizes a timer interrupt at 10 millisecond time intervals and it is used for handling telephone operations including dialing and communications through the modem. The "TIME SLICER" operation and a "PHONE HANDLER" operation are shown in drawing figures of the aforementioned prior applications.

Memory locations or registers are provided in RAM for keeping track of elapsed time, meter data and control data. The meter data includes the accumulated total, TOD and TR totals and a leak total. The control data includes selected windows exempt times, call time and transmission control data. The access to such memory locations or registers is indicated in the structure chart of FIG. 3.

FIG. 4 illustrates the wake-up operation which is initiated in response to a signal applied through line 53 from the reset and power control circuit 50. Certain initializing operations are performed including disabling of reset, timer and UART interrupts, the initialization of a stack pointer and setting up of input-output ports to a certain condition. Then a "POWER ON" test is made to determine whether the AMR 15 is being used for the first time, after installation of a battery, which is made by determining whether certain values are stored in certain ram locations. Then initialization steps are performed, if required. If not a test determines whether there was a signal on the "PHONAL" line 55. If so, a bit of the status register is clear and a control flag or "TX-ID" is set to a "wait carrier" condition. Then the start time slice operation is performed and, as part of the time slicer operation, a phone handler operation is performed. Such operations function to make a check to determine whether the incoming telephone call was originated by the CCM and if so, to take appropriate action such as an installation transaction, a demand reading transaction, or a "brainwash" transaction. A similar sequence takes place if the wake-up was initiated in response to a tamper condition, differing in that a control flag is set to a "seize" state so that in response to the next 10 millisecond time slice interrupt, a seizure of the telephone line is initiated. The hook switch is then placed in an off/hook condition and upon receipt of dial tone, the system effects dialing of the number of the CCM 12, and then transmits data through the application of signals on the line 32 to the modem. Such data, of course, will include information as to the tamper condition, and other information as hereinafter described.

If the wake-up reset is in response to a time-out signal on line 54, an "UPDATE TIME" operation is performed, and then a scheduled report-due check is made and either the time slice operation is imitated or the meter data is updated. Then the next alarm time is set in the manner as shown in the aforementioned prior applications to load a certain count into the counters of the wake-up counter 41 and to cause the next signal on line 54 to be generated after a certain time. Then a final check is made and the microprocessor 52 places itself back in the power-down or "sleep" condition.

FIG. 5 corresponds to part of a right-hand portion of the flow chart of FIG. 4 and shows a modified operation performed in connection with the malfunction protection system of the invention. After a time-out of the wake-up timer 41 and after checking to see if it is time for a scheduled report, a test is made to determine whether a "off" bit is set, this bit being a bit in RAM which may set from the UCC 11 through the CCM 12 when, for example, service to a customer has been discontinued while the AMR 15 remains connected and operative, awaiting resumption of service to the same customer or start of service to a new customer at the same premises. If the "off" bit is set and a meter count greater than zero is detected, a special report call is initiated to report the condition.

As also shown in FIG. 5, a test may be made to detect whether a malfunction flag is set and, if so, the special report is initiated to report that condition as well as provide other status information. The malfunction flag may be set in response to conditions such as a freeze condition, a tilt condition of the AMR unit, detectable through a suitable switch which may be connected to an additional input of the status register buffer 194.

The malfunction flag may, of course, be set in response to other conditions. FIG. 6 shows an arrangement for detecting one type of malfunction which could present problems, especially in arrangements in which a metering switch is at a distance from an AMR or is otherwise so arranged that there is an exposed connecting wire which might be cut by a customer or which might accidentally become severed so as to be continuously opened or shorted so as to be continuously closed. As shown, a resistor 290 is connected in series with a meter switch 291 and a second resistor 292 is connected in parallel with the series combination of resistor 290 and switch 291. The combination of resistors 290 and 292 and the switch 291 is connected through lead wires 293 and 294 to terminals 295 and 296 of metering circuits of an AMR which includes comparator and de-bounce circuitry 298 supplied with an operating voltage from an output terminal 299 of a strobe circuit 300. Terminal 299 is connected through a resistor 301 to the terminal 295. The comparator and de-bounce circuit 298 has an output terminal 303 which may be connected to a meter pulse accumulator counter and an output terminal 304 which provides a malfunction output indication and which may be connected to a buffer stage of a status register. The strobe circuit 300 operates periodically to briefly apply an operating voltage at terminal 299 so as to develop a certain voltage at terminal 295 which is dependent upon the condition of the switch 291 and the connecting wires 293 and 294. At the same time, comparator circuitry is operated. If the switch 291 is operating properly, certain voltages will be developed at the input of the circuit 298 dependent upon the condition of the switch 291. If, however, the wires 293 and 294 are shorted together, a lower resistance is developed at all times or, if one of the other of the connecting wires 293 or 294 is open, a higher than normal voltage will be developed at the input of the circuit 298. In either case, circuit 298 develops a malfunction indication at the terminal 304. Circuitry 298 also responds to normal closures of the switch 291 to develop de-bounced output pulses at the terminal 303 for application to a meter pulse accumulator counter. This circuit arrangement minimizes power consumption.

The malfunction protection system of FIGS. 5 and 6 may be incorporated in an alternative embodiment of an automatic meter reader or "AMR" which is shown in detail in FIGS. 34, 35 and 36 of prior application Ser. No. 109,446, now U.S. Pat. No. 4,866,761, filed June 19, 1987. The AMR 310 of that alterative embodiment is similar to the AMR 15 of FIG. 2 but differs therefrom in the inclusion of a demand signal detector circuit and in use of modified circuits including modified telephone interface, power supply and modem circuits to obtain advantages including reduced power consumption, simplicity, reliability, protection against transient voltage spikes on the telephone line and avoidance of interference with a subscriber's use of his telephone line.

It will be understood that modifications and variations may be effected without departing from the spirit and scope of the novel concepts of this invention.

We claim:

1. A malfunction protection system, comprising: malfunction detecting means having input terminals, and metering means having output terminals arranged to be coupled through connecting lead wire means to said input terminals of said malfunction detecting means for transmission of metering pulses to said malfunction detecting means, said metering means in developing metering pulses being arranged to shift between a first state in which a predetermined low impedance is presented between said output terminals thereof and a second state in which a predetermined higher impedance is presented between said output terminals of said metering means, and said malfunction detecting means including voltage supply means, impedance means coupling said voltage supply means to said input terminals of said malfunction detecting means, and voltage comparator means coupled to said input terminals of said malfunction detecting means to respond to changes in the impedance presented by said metering means and connecting lead wires, said comparator means being arragned to develop metering signals in response to shifts between voltages at said input terminals of said malfunction detecting means which correspond to said predetermined low impedance and high impedance states of said metering means, and said comparator means being arranged to develop a malfunction signal in response to a voltage at said input terminals of said malfunction detecting means which is substantially outside a range of voltages at said input terminals of said malfunction detecting means which correspond to said predetermined low impedance and higher impedance states of said metering means.

2. A malfunction protection system as defined in claim 1, wherein said malfunction signal is developed in response to a voltage at said input terminals which is substantially higher than a voltage corresponding to said higher impedance state of said metering means, whereby malfunctions are detected including cutting of said connecting wires.

3. A malfunction protection system as defined in claim 2, wherein said malfunction signal is also developed in response to a voltage at said input terminals which has an average value substantially lower than a voltage corresponding to said low impedance state, whereby malfunctions are detected including shorting of said connecting wires.

4. A malfunction protection system as defined in claim 2, wherein said metering means includes metering switch means connected in parallel relation to said output terminals of said metering means and operable between open and closed conditions, and impedance means coupled in parallel relation to said output terminals of said metering means to present said predetermined higher impedance in the open condition of said metering switch means.

5. A metering system comprising: a plurality of automatic meter readers each arranged for connection to a telephone line and for transmission of meter data to a utility control center means, each of said meter readers including data generating means for generating meter data, data storage means for storing generated meter data and data transmission means for transmitting stored meter data from said data storage means over a telephone line to said utility control center means, said data generating means including malfunction detecting means having input terminals, and a metering circuit having output terminals arranged for connection through connecting lead wires to said input terminals of said monitoring circuit, said metering means in normal operation being arranged to operate through said connecting lead wires to present predetermined low and higher impedances at said input terminals of said malfunction detecting means, and said malfunction detecting means being arranged to respond to said predetermined low and higher impedances to develop metering signals and being also arranged to respond to impedances outside the range of said predetermined low and higher impedances to develop malfunction signals.

6. A metering system as defined in claim 5, wherein said malfunction detecting means includes voltage supply means, impedance means coupling said voltage supply means to said input terminals thereof, and voltage comparator means coupled to said input terminals to respond to changes in the impedance presented by said malfunction detecting means and connecting lead wires.

7. A metering system as defined in claim 6, wherein said malfunction signal is developed in response to a voltage at said input terminals of said malfunction detecting means which is substantially higher than a voltage corresponding to said higher impedance state of said metering means.

8. A metering system as defined in claim 5, wherein said metering means includes metering switch means connected in parallel relation to said output terminals of said metering means and operable between open and closed conditions, and impedance means coupled in parallel relation to said output terminals of said metering means to present said predetermined higher impedance in the open position of said metering switch means.

9. A malfunction protection system, comprising: malfunction detecting means having input terminals, and metering means having output terminals arranged to be coupled through connecting lead wire means to said input terminals of said malfunction detecting means for transmission of metering pulses thereto, said metering means in developing metering pulses being arranged to normally effect shifts between a first state in which a low impedance is presented between said output terminals thereof and a second state in which a predetermined higher impedance is presented between said output terminals of said metering means, and said malfunction detecting means including voltage supply means, impedance means coupling said voltage supply means to said input terminals of said malfunction detecting means, and sensing means for developing an output signal as a function of voltages at said input terminals of said malfunction detecting means to develop an output metering pulse signal in response to normal shifts of said metering means between said first and second states and to develop an output malfunction signal in response to either a shorted condition of said connecting lead wire means or an open condition of said connecting lead wire means.

10. A malfunction protection system as defined in claim 9, wherein said voltage supply means includes strobe circuit means operable periodically to effect brief applications of operating voltage through said impedance means to said input terminals of said malfunction detecting means, and wherein said sensing means is operable during brief applications of an operating voltage by said strobe circuit means to develop an output malfunction signal in response to said open condition of said connecting lead wire means.

11. A malfunction protection system as defined in claim 10, wherein said sensing means is also operable during brief applications of an operating voltage by said strobe circuit means to develop an output malfunction signal in response to shorted condition of said connecting lead wire means.

* * * * *